United States Patent
Arai et al.

(10) Patent No.: US 6,643,667 B1
(45) Date of Patent: Nov. 4, 2003

(54) SYSTEM AND METHOD FOR REPLICATING DATA

(75) Inventors: Kouji Arai, Odawara (JP); Susumu Suzuki, Oiso (JP); Hironori Yasukawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/528,416

(22) Filed: Mar. 17, 2000

(30) Foreign Application Priority Data

Mar. 19, 1999 (JP) ............................................ 11-075174

(51) Int. Cl.⁷ ........................ G06F 17/30; G06F 13/00; G06F 12/00; H02H 3/05
(52) U.S. Cl. ........................ 707/200; 707/1; 710/33; 711/112; 711/114; 711/167; 714/6
(58) Field of Search ..................... 707/1, 200; 710/33; 711/112, 114, 167; 714/6

(56) References Cited

U.S. PATENT DOCUMENTS

| | | | | |
|---|---|---|---|---|
| 5,212,784 A | * | 5/1993 | Sparks ......................... | 395/575 |
| 5,390,313 A | * | 2/1995 | Yanai et al. ................. | 395/425 |
| 5,392,244 A | * | 2/1995 | Jacobson et al. ........... | 365/200 |
| 5,423,046 A | * | 6/1995 | Nunnelley et al. ......... | 395/750 |
| 5,432,922 A | * | 7/1995 | Polyzois et al. ............. | 395/425 |
| 5,435,004 A | * | 7/1995 | Cox et al. ................... | 395/575 |
| 5,742,792 A | | 4/1998 | Yanai et al. | |
| 5,819,310 A | * | 10/1998 | Vishlitzky et al. .......... | 711/114 |
| 5,845,295 A | | 12/1998 | Houseman et al. ......... | 707/204 |
| 5,852,715 A | | 12/1998 | Raz et al. | |
| 5,857,208 A | | 1/1999 | Ofek ........................... | 707/204 |
| 5,897,661 A | * | 4/1999 | Baranovsky et al. ........ | 711/170 |
| 5,961,652 A | * | 10/1999 | Thompson ...................... | 714/6 |
| 5,983,316 A | * | 11/1999 | Norwood ...................... | 711/112 |
| 5,987,566 A | * | 11/1999 | Vishlitzky et al. .......... | 711/114 |
| 6,009,481 A | * | 12/1999 | Mayer .......................... | 710/33 |
| 6,023,584 A | * | 2/2000 | Barton et al. ................ | 395/712 |
| 6,035,412 A | | 3/2000 | Tamer et al. | |
| 6,092,066 A | | 7/2000 | Ofek | |
| 6,101,497 A | | 8/2000 | Ofek | |
| 6,105,118 A | * | 8/2000 | Maddalozzo, Jr. et al. . | 711/167 |
| 6,112,257 A | * | 8/2000 | Mason, Jr. et al. .......... | 710/18 |
| 6,496,839 B2 | * | 12/2002 | Cabrera et al. ............. | 707/203 |
| 6,507,883 B1 | * | 1/2003 | Bello et al. .................... | 711/4 |

FOREIGN PATENT DOCUMENTS

| | | | |
|---|---|---|---|
| EP | 0 671 686 A1 | 2/1995 | |
| WO | 99/15957 | * 4/1999 | ............ G06F/9/00 |

* cited by examiner

Primary Examiner—Frantz Coby
(74) Attorney, Agent, or Firm—Townsend and Townsend and Crew LLP

(57) ABSTRACT

According to the present invention, techniques for controlling copying of logical volumes within a computer storage system are provided. A representative embodiment includes a plurality of storage devices controlled by a control unit, one or more processors, and a buffer memory for temporarily storing data read from the storage devices within the control unit. The storage devices can be addressed as logical volumes.

37 Claims, 15 Drawing Sheets

FIG.2

| COMMAND NAME | PAIR STATUS | | |
|---|---|---|---|
| | NO PAIR | PAIRED NOT COPIED | PAIRED AND COPIED |
| CREATE PAIR | CREATE NEW PAIR (231) | DO NOTHING (232) | DO NOTHING (233) |
| DELETE PAIR | DO NOTHING (241) | DELETE PAIR (242) | DELETE PAIR (243) |
| CREATE COPY (SPLIT OPERATION) | DO NOTHING (251) | INITIATE COPYING (252) | DO NOTHING (253) |
| RE-SYNCHRONIZE | DO NOTHING (261) | DO NOTHING (262) | INITIATE RE-SYNCHRONIZE COPY (263) |

FIG.3

| PAIR NUMBER | PAIR STATUS | PRIMARY VOLUME | SECONDARY VOLUME | COPY POINTER |
|---|---|---|---|---|
| 1 | PAIRED NOT COPIED | 12 | 64 | 0 |
| : | : | : | : | : |

1504

```
Volume List
  Port    S-Vol              Port    T-Vol               Pair
  ID LWN  Vol#  Status       ID LUN  Vol#  Status       Status
  1C:4:00 2:23  Normal       1E:F:00 2:2C  Normal       Duplex
  1C:4:00 2:23  Normal       1E:F:01 2:2D  Normal       Duplex
```

FIG. 11B

SYSTEM AND METHOD FOR REPLICATING DATA

CROSS-REFERENCES TO RELATED APPLICATIONS

This application claims priority from Japanese Patent Application Reference No. 11-075174 filed Mar. 19, 1999, the entire contents of which is incorporated herein by reference for all purposes.

BACKGROUND OF THE INVENTION

The present invention relates generally to computing systems and more specifically to techniques for controlling copying of logical volumes within a computer storage system.

Modern computing systems can comprise a plurality of logical volumes within a mass storage system. Mass storage systems can be implemented in a variety of form factors, including DASD, optical storage media, tape storage media, and the like. Often, it is desirable to perform copies of content from one logical volume to another logical volume in a mass storage system. A conventional method for performing such a copy is known as a REMOTE COPY function. In the REMOTE COPY function, host channels are used for transferring the copied data. A control unit, behaving as if it were a processing unit, sends data stored in a logical volume via a host channel. The data is received by another host channel and written to the logical volume. Thus, a copy of the logical volume is created.

When the copy function is executed in one control unit, a plurality of host channels is employed. Therefore, the number of host channels available for the normal host connection is decreased. Such conventional methods typically burden computational resources, such as host channels, during the copy process.

What is really needed are techniques for copying information from one logical volume to another without burdening host channel resources for connecting between the control unit and processing units.

SUMMARY OF THE INVENTION

According to the present invention, techniques for controlling copying of logical volumes within a computer storage system are provided. A representative embodiment includes a plurality of storage devices controlled by a control unit, one or more processors, and a buffer memory for temporarily storing data read from the storage devices within the control unit. The storage devices can be addressed as logical volumes.

In an exemplary embodiment, the invention provides a method for creating a copy on a second logical volume of data stored on a first logical volume. The method can comprise a variety of steps, such as specifying a relationship between two or more logical volumes. The method can also include creating a copy of data in a specified first logical volume into said second logical volume. Creating such a copy can include steps of copying data from the first logical volume to a first location in a buffer memory located within a control unit. Copying can be performed by the control unit substantially independently of processor control. Then, data can be copied from the first location in the buffer memory to a second location in the buffer memory. Subsequently, data from the second location in the buffer memory can be copied to the second logical volume. This copying can be performed by the control unit substantially independently of processor control, also. As used herein, substantially independently of processor control can include performing copy processing at the control unit level without necessitating intermediate communication between a command start from the processor to the control unit and a command complete signal from the control unit to the processor.

In another embodiment, the invention provides a computer system comprising a plurality of devices. A plurality of storage devices controlled by one or more control units can be part of the computer system. One or more processing units operable to access the control unit or units can also exist in the computer system. A buffer memory operable to temporarily store data read from the storage devices within the control unit can also be part of the computing system. The storage devices can be addressed as one or more logical volumes. The control unit is able to establish a relationship between at least two logical volumes (i.e., a first logical volume and a second logical volume) located in the storage devices. The control unit can create a copy of data in the first logical volume into the second logical volume. Such creating a copy can include copying data from the first logical volume to a first location in the buffer memory. Then, the data can be copied from the first location in the buffer memory to a second location in the buffer memory, changing meta-data indicating the device that may access the data to reflect the second logical volume. Thereupon, the data can be copied from the second location in the buffer memory to the second logical volume. These operations by the control unit can be performed substantially independently of the processing units. In a representative embodiment, the buffer can comprise approximately 10 Gigabytes, for example.

In a further embodiment, the invention provides a computer program product for controlling the copying of information from a first logical volume to a second logical volume in a computer system. The computer program product can comprise a computer readable storage medium containing a variety of program code. Code for specifying a relationship between the first logical volume and the second logical volume can be part of the computer program product. The product can also include code for creating a copy of data in the first logical volume into the second logical volume. The code for creating a copy can comprise various program codes. Program code for copying data from the first logical volume to a first location in a buffer memory can be part of the program product. The product can also include code for copying the data from the first location in the buffer memory to a second location in the buffer memory. Code for copying the data from the second location in the buffer memory to the second logical volume can also part of the program product. The codes for copying the data from the first location in the buffer memory to the second location in the buffer memory is executed by a control unit substantially independently of a central processing unit.

Select embodiments according to the present invention can be operable with an arrayed disk subsystem. Data may be readily moved to a logical volume having different access characteristics by creating a pair among logical volumes having different RAID levels. Specific embodiments according to the present invention can include a function for creating the data copy, such that, a single logical volume is defined as a primary volume, plural different logical volumes are defined as secondary volumes, and each pair is defined as a different pair.

Numerous benefits are achieved by way of the present invention over conventional techniques. Some embodiments according to the present invention can create a copy of specified logical volume without occupying host channels. In such embodiments, control unit load can be reduced. Many embodiments according to the present invention can create a copy at a specified time. Further, in specific embodiments, data in a secondary volume can be used as a series of the historical records of the primary volume switching the secondary volumes one after another. Many embodiments enable data to be replicated more easily, quickly and with improved system loading than heretofore known methods. These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 2 illustrates a simplified diagram of a representative command operation in a computing system such as that of FIG. 1 in a specific embodiment according to the present invention;

FIG. 3 illustrates a simplified diagram of representative information operable in a specific embodiment according to the present invention;

FIGS. 11A–11G illustrate representative display screens in a specific embodiment according to the present invention.

DESCRIPTION OF THE SPECIFIC EMBODIMENTS

The present invention provides techniques for controlling copying of logical volumes within a computer storage system. Embodiments according to the present invention can be operable on a wide range of storage devices and systems, for example. Some embodiments can support a buffer memory size of 10 Gigabytes, for example. However, embodiments can support other buffer memory configurations as well. Embodiments can be operable with S/390™, UNIX™, Windows NT™ platforms for example. Many other hardware and software platforms are also suitable for implementing embodiments according to the present invention.

Figure 1:
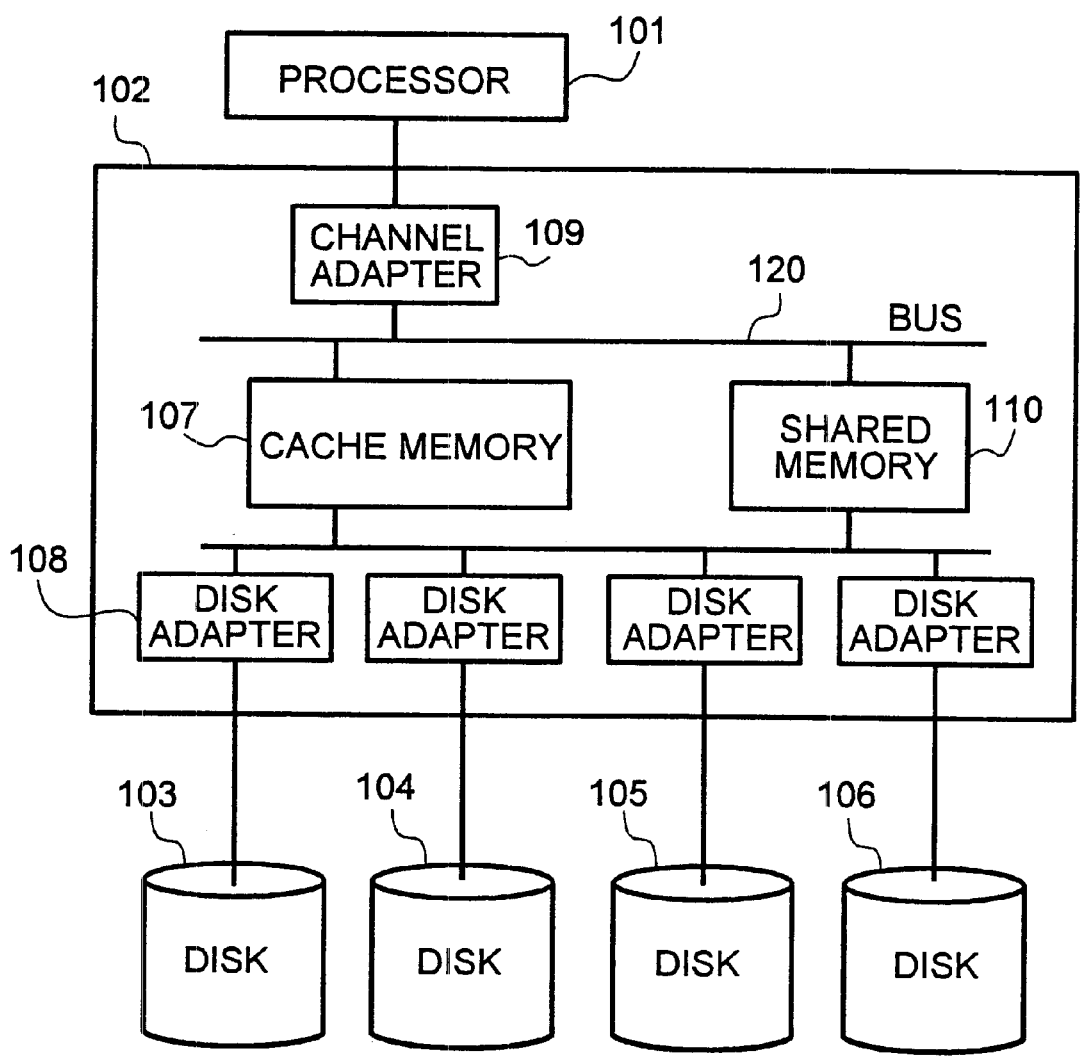
FIG. 1 illustrates a simplified block diagram of a representative example computing system in a specific embodiment according to the present invention.

FIG. 1 illustrates a simplified block diagram of a representative example computing system in a specific embodiment according to the present invention. This diagram is merely an illustration and should not limit the scope of the claims herein. One of ordinary skill in the art would recognize other variations, modifications, and alternatives. FIG. 1 illustrates a control unit 102 comprising a cache memory 107, a channel adapter ("CHA") 109, a disk adapter ("DKA") 108, a shared memory 110, for storing control information, for example, and a bus 120 connecting the above mentioned components. A plurality of storage devices 103, 104, 105, and 106 can be coupled to control unit 102. Further, control unit 102 can be coupled to, and can execute commands from, a processing unit 101. Control information can be transferred from the shared memory 110 to the channel adapter 109 or to the disk adapter 108 via the bus.

FIG. 2 illustrates a simplified diagram of a representative command operation in a computing system such as that of FIG. 1 in a specific embodiment according to the present invention. This diagram is merely an illustration and should not limit the scope of the claims herein. One of ordinary skill in the art would recognize other variations, modifications, and alternatives. FIG. 2 illustrates representative command set comprising a command name 210, which can be a create pair command 211, a delete pair command 212, a copy command 213 and a re-synchronize command 214, and the like.

Create pair command 211 can be used to establish a pair by specifying a primary volume and a secondary volume. Embodiments can perform an initial copy operation to copy data from the specified primary volume to the specified secondary volume. The primary volume continues to be accessible to applications during the initial copy. In a specific embodiment, a pace may be selected for initial copy operations. Pace can be slow, indicating copy of one track at a time, medium, for three tracks at a time, and fast, for fifteen tracks at a time, for example. Slower paces can minimize use of system resources, while faster paces can accomplish the copy operation sooner. Other embodiments using other or different copy speeds will be readily apparent to one of ordinary skill in the art without departing from the scope of the claimed invention.

Figure 8:
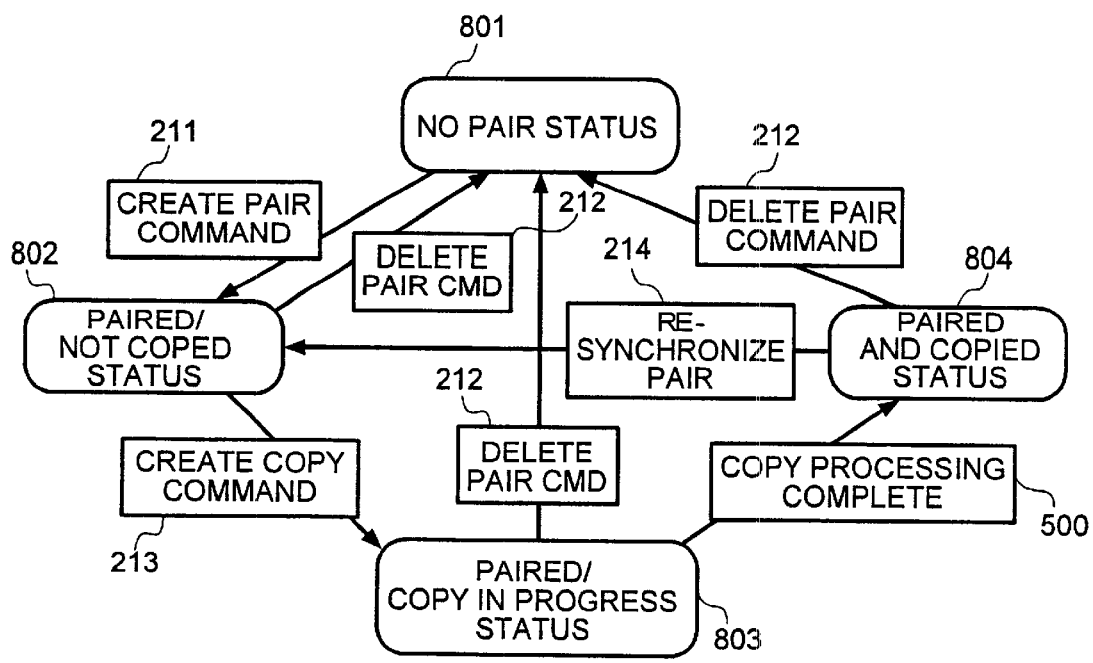
FIG. 8 illustrates a simplified diagram of a representative pair status transition in a specific embodiment according to the present invention.

In a representative embodiment according to the present invention, command processing can perform various actions, such as actions 231–263 illustrated in FIG. 2, as well as update a command status. FIG. 8 illustrates a plurality of commands and corresponding status changes in a particular embodiment according to the present invention. For example, a delete pair command 212 can be used to release a pair. Delete pair command processing halts updates to the secondary volume and changes pair status to "no pair" status 801 in FIG. 8. A pair can be deleted any time after the pair has been created. Once a pair is deleted, the secondary volume becomes available for write operations upon being unreserved.

Copy command 213 can be used to create a copy to a secondary volume. In a presently preferred embodiment, the copy command can cause updates pending for the specified secondary volume to be made. Upon invocation, the pair status changes to "paired/copy in progress" status 803. Once copy processing has completed, the status can change to "paired and copied" status 804. An instance of pair tracking information, indicating pair number, primary and secondary volumes and the like, is added to pair information 300 in order to represent the newly created pair. The secondary volume is then made available for read/write access by applications. The primary volume continues to be accessible to applications during create pair command processing. As with create pair command 211 processing, a pace may be selected for update copy operations from among slow, medium and fast.

Re-synchronize pair command 214 can bring a status transition to "paired and not copied" status again after a copy is created. In a presently preferred embodiment, re-synchronize pair processing can compare the secondary volume track map with the primary volume track map in control information 401 of FIG. 4 in order to determine all unequal tracks. Then, unequal tracks can be copied from the primary volume to the secondary volume. As with create pair command 211 processing, a pace may be selected for the re-synchronize copy operations from among slow, medium and fast.

FIG. 3 illustrates a simplified diagram of representative information in a specific embodiment according to the present invention. This diagram is merely an illustration and should not limit the scope of the claims herein. One of ordinary skill in the art would recognize other variations, modifications, and alternatives. FIG. 3 illustrates representative pair information 300 comprising a pair number 301, a pair status 302, a primary volume number 303, a secondary volume number 304, and a copy pointer 305. Pair information 300 can be stored in shared memory 110, for example. Other embodiments can include other information. Further, some embodiments may not comprise all of the elements of pair information 300.

Figure 4:
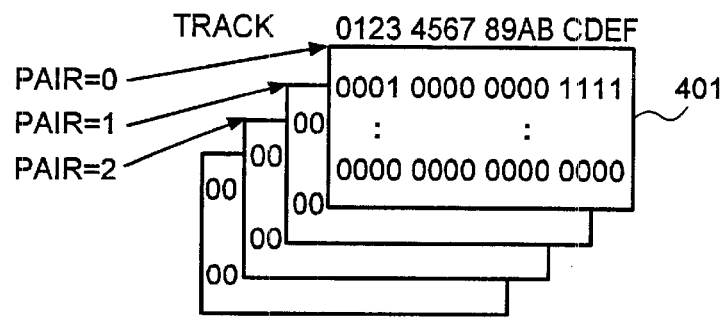
FIG. 4 illustrates a simplified diagram of representative information operable in a specific embodiment according to the present invention.

FIG. 4 illustrates a simplified diagram of representative information in a specific embodiment according to the present invention. This diagram is merely an illustration and should not limit the scope of the claims herein. One of ordinary skill in the art would recognize other variations, modifications, and alternatives. FIG. 4 illustrates representative control information 401. Control information 401 can facilitate the tracking of inequalities among data sets in a pair. In a particular embodiment, control information 401 comprises an array searchable by pair number 301, for example. Entries in control information 401 can comprise a set of the inequality information bits, in this embodiment. An inequality information bit can be reset to value of zero ("0") if the data in corresponding tracks of the primary volume and the secondary volume is equal, and set to a value of one ("1") if the data is made unequal. Control information 401 can be stored in shared memory 110, for example.

Figure 5:
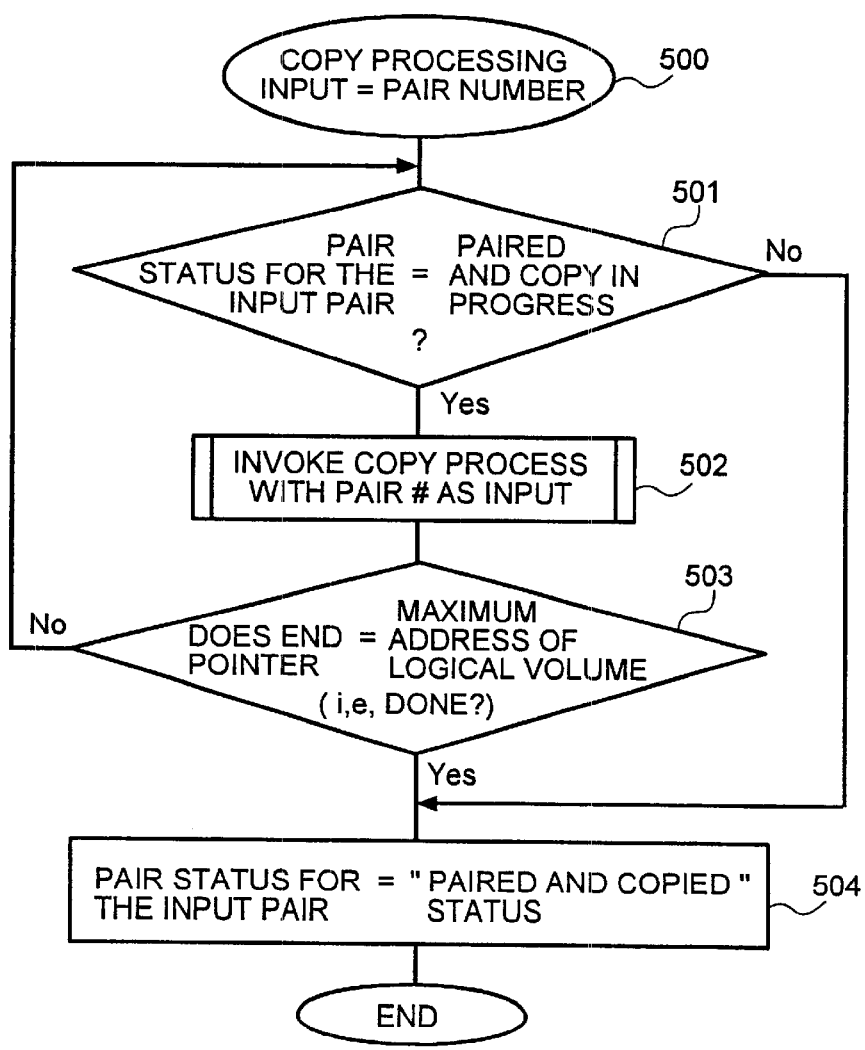
FIG. 5 illustrates a simplified flow chart of representative copy processing in a specific embodiment according to the present invention.

FIG. 5 illustrates a simplified flow chart of representative copy processing in a specific embodiment according to the present invention. This diagram is merely an illustration and should not limit the scope of the claims herein. One of ordinary skill in the art would recognize other variations, modifications, and alternatives. FIG. 5 illustrates representative copy command processing 500. Copy command processing 500 can be initiated responsive to receiving a create pair command 211 or create copy command 213, with a pair number as input parameters, for example. In a decisional step 501, the control unit searches pair information 300 for an entry having the same pair number as specified in the input information. Once a suitable entry is located, the pair status 302 of the entry is checked and a determination is made whether the pair status is "paired and not copied" status 802. If the pair status is not "paired and not copied" status 802, a determination is made that the copy command should not continue and copy processing is terminated. If the pair status is "paired and not copied" status 802, then in a step 502, an elemental copy processing 600 is initiated with the pair number as an input parameter. After elemental copy processing 600 completes, then in a decisional step 503 a determination is made whether any further copy processing is to be performed. In a specific embodiment, decisional step 503 can comprise checking a copy pointer 305 for a match with the maximum address of the logical volume. If the copy pointer 305 does not match the maximum address, the copy processing is determined to be incomplete and processing continues by repeating step 501. Otherwise, if a match is found, then no further copying remains and processing continues with a step 504. In step 504, the pair status 302 is changed to "paired and copied" status and copy processing is complete.

Figure 6:
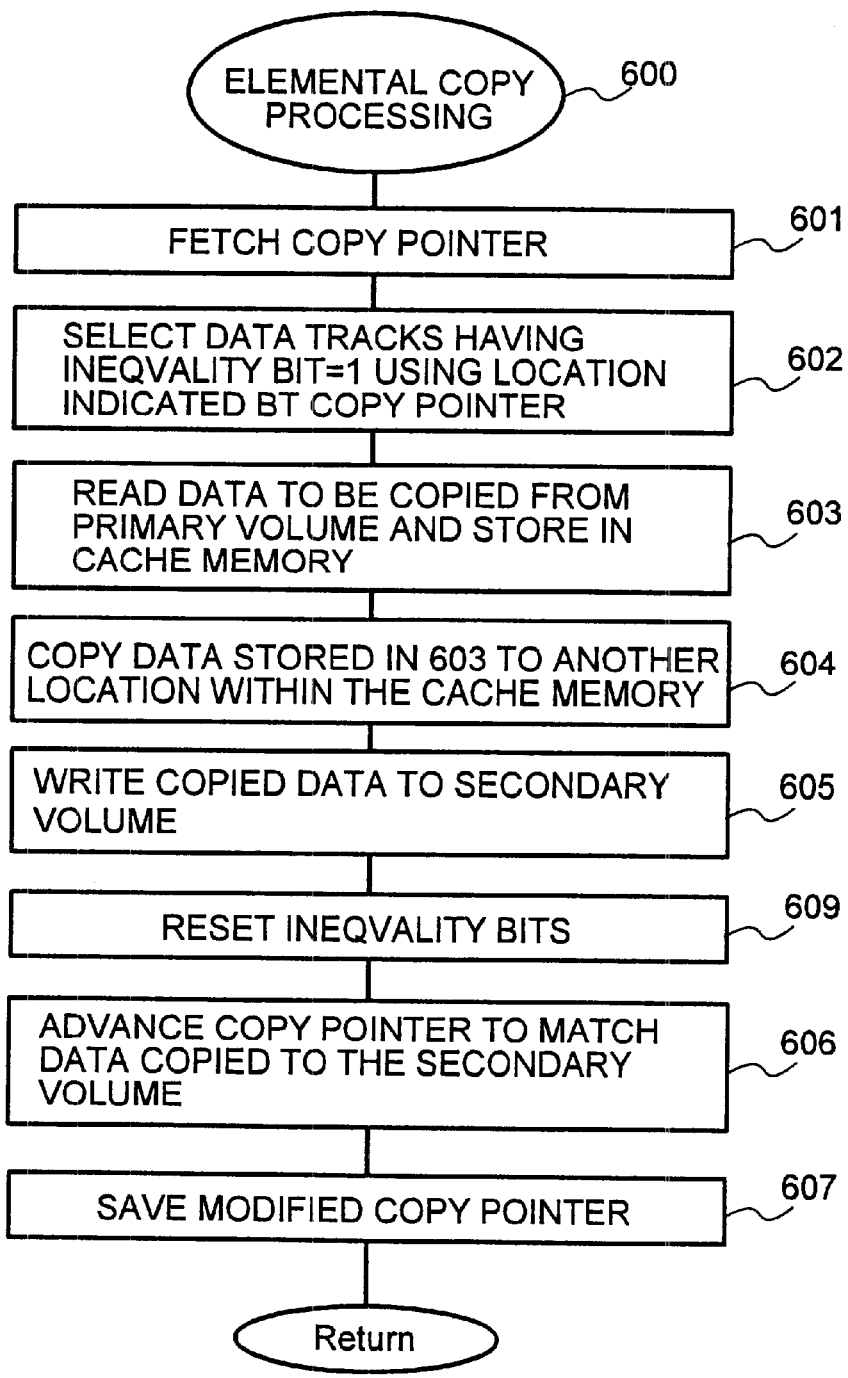
FIG. 6 illustrates a simplified flow chart of representative elemental copy processing in a specific embodiment according to the present invention.

FIG. 6 illustrates a simplified flow chart of representative elemental copy processing in a specific embodiment according to the present invention. This diagram is merely an illustration and should not limit the scope of the claims herein. One of ordinary skill in the art would recognize other variations, modifications, and alternatives. FIG. 6 illustrates elemental copy processing 600. Elemental copy processing 600 includes a step 601, in which a control unit searches pair information 300 for an entry having the same pair number as specified in the input information. Then, in a step 601, the control unit can fetch the copy pointer 305 related to the selected entry. Next, in a step 602, the control unit searches control information 401 for data having an inequality bit set to a value of one ("1") using the address specified by the copy pointer 305 fetched in step 601. Next, in a step 603, the control unit reads the data referred to in step 602 from the primary volume and stores it in cache memory 107. In a step 604, the data stored in the cache memory in step 603 is copied to another location in the cache memory 107 and the logical volume number included in the copied data is changed to the secondary volume number 304 from the primary volume number 303. Then, in a step 605, the data copied in step 604 is written to the secondary volume. In a step 609, the inequality bits related to the data Written to the secondary volume are reset to a value of zero ("0"). Next, in a step 606, the copy pointer 305 is advanced by an amount corresponding to the amount of data written to the secondary volume. In a step 607, the copy pointer modified in step 606 is stored in the pair information 300, the elemental copy processing is completed, and processing returns to the caller in a step 608.

Figure 7:
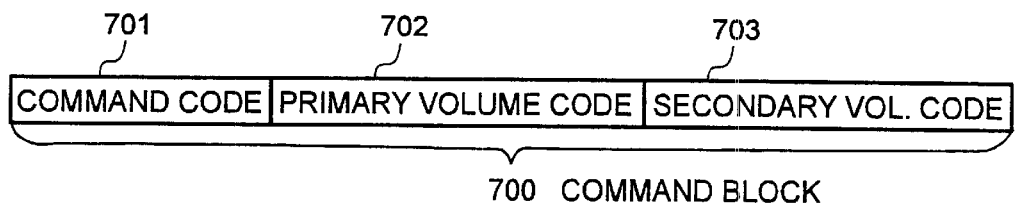
FIG. 7 illustrates a simplified diagram of a representative command block format in a specific embodiment according to the present invention.

FIG. 7 illustrates a simplified diagram of a representative command block format in a specific embodiment according to the present invention. This diagram is merely an illustration and should not limit the scope of the claims herein. One of ordinary skill in the art would recognize other variations, modifications, and alternatives. FIG. 7 illustrates a representative command block comprising a command code 701, a primary volume number 702, and a secondary volume number 703. When a control unit 102 receives a command block, it searches pair information 300 for pair entries having the same combination of primary volume number 303 and secondary volume number 304 as that of the primary volume number 702 and secondary volume number 703 specified in the command block. The control unit obtains the pair status 302 from this entry and initiates the processing shown in FIG. 2 based upon the command code 701 stored in command block 700.

For example, if the status of the pair specified by a create pair command 211 is "no pair" status 221, the control unit initiates create a new pair processing 231. In a specific embodiment, an empty entry is assigned to the pair information 300. A pair comprising a primary volume number and a secondary volume number specified in the create pair command 211 can be set into the area of primary volume number 303 and the area of secondary volume number 304 in the pair information 300 respectively. A copy pointer 305 is initialized, and then copy process 500 is initiated.

If the pair specified in create pair command 211 is in a status other than "no pair" status 221, the control unit does nothing. If the pair specified in a delete pair command 212 has "no pair" status 221, the control unit does nothing. If the pair specified in a delete pair command 212 is in paired status 222 or 223, the control unit initializes the entry of the pair information 300 corresponding to the specified pair.

If the pair specified by a create copy command 213 is in "no pair" status 221, the control unit does nothing. If the pair specified in a create copy command 213 is in "paired and not copied" status 222, the control unit sets the inequality bit in the control information table 401 to a value of one ("1") for the data of the specified volume. Then, the control unit initializes the copy pointer 305, and invokes the copy processing 500. If the pair specified by a create copy command 213 is in "paired and copied" status 223, the control unit does nothing.

If the pair specified by re-synchronize pair command 214 is in "no pair" status 221, the control unit does nothing. If the pair specified by re-synchronize pair command 214 is in "paired and not copied" status 222, the control unit does nothing. If the pair specified by a re-synchronize pair command 214 is in "paired and copied" status 223, the control unit changes the current pair status to "paired and not copied" status 222.

FIG. 8 illustrates a representative pair status transition diagram for pair status 302 in a typical entry of pair information 300 in a specific embodiment according to the present invention. This diagram is merely an illustration and should not limit the scope of the claims herein. One of ordinary skill in the art would recognize other variations, modifications, and alternatives. In FIG. 8, a "no pair" status 801 indicates that a pair has not been established. A "paired and not copied" status 802 indicates that a pair has been established but a copy to the secondary volume has not been initiated yet. A "paired and copy in progress" status 803 indicates that copy processing to the secondary volume is being executed. A "paired and copied" status 804 indicates that copy to the secondary volume is complete.

A delete pair command 212 causes a status transition to "no pair" status 801 from any status. A create pair command 211 causes a status transition to "paired and not copied" status 802 from "no pair" status 801. A create copy command 213 causes a status transition to "paired and copy in progress" status 803 from "paired and not copied" status 802. Copy processing 500 completion causes a status transition to "paired and copied" status 804 from "paired and copy in progress" status 803. A re-synchronize pair command 214 causes a status transition to "paired and not copied" status 802 from "paired and copied" status 804.

Figure 9:
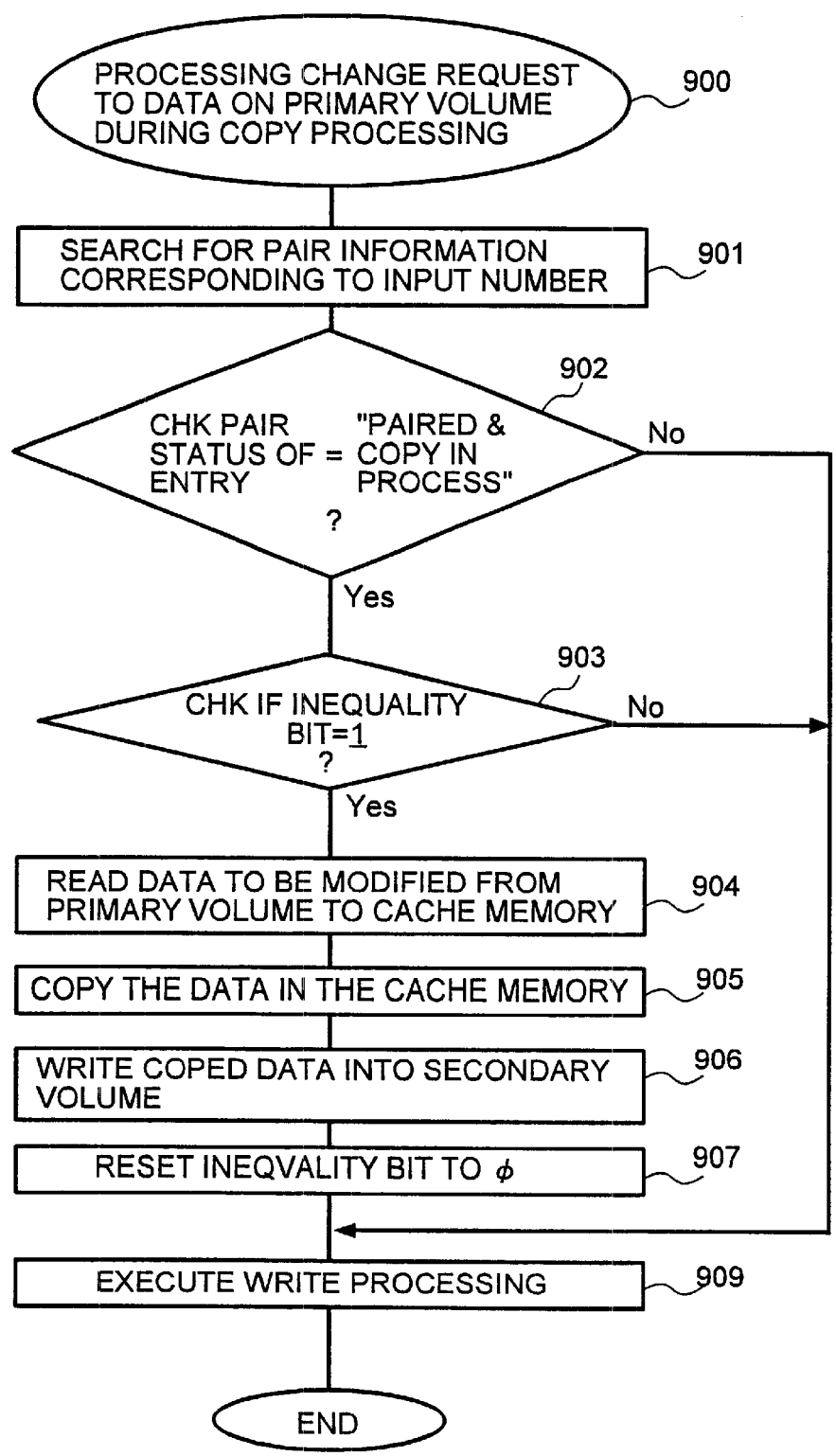
FIG. 9 illustrates a simplified flow chart of representative processing in a specific embodiment according to the present invention.

FIG. 9 illustrates a simplified flow chart of representative change request processing in a specific embodiment according to the present invention. This diagram is merely an illustration and should not limit the scope of the claims herein. One of ordinary skill in the art would recognize other variations, modifications, and alternatives. A request to change the data in a primary volume may be made during a copy process, for example. FIG. 9 illustrates a step 901, in which a control unit, such as control unit 102 of FIG. 1, for example, searches the pair information 300 for entries having the same primary volume number as the volume number specified in the input information for the change request. In a step 902, the control unit fetches the pair status 302 from the entry corresponding to the pair number obtained in step 901 and checks if the pair status is in "paired and copy in progress" status 803.

If the status is not "paired and copy in progress" status 803, then the control unit executes a normal write processing in a step 909. Otherwise, if the status is "paired and copy in progress" status 803, then control unit processing continues with a step 903. In step 903, the control unit searches the control information 400 corresponding to the data to be modified as requested by the processing unit 101. The control unit can perform this searching using the pair number obtained in step 901. Once located, the control unit checks the corresponding inequality bit for a value of one ("1"). If the bit does not have a value of one, then the control unit processing continues with step 909, which executes normal write processing. Otherwise, if the bit is a one, then the control unit processing continues with a step 904. In step 904, the data to be modified is read from the primary volume into the cache memory. Then, in a step 905, the data read into the cache memory in step 904 is copied in the buffer memory for the secondary volume and the logical volume number included in the copied data is changed to the secondary volume number 304 from the primary volume number 303. Then, in a step 906, the data copied in step 905 is written to the secondary volume. Next, in a step 907, the inequality bit corresponding to the data written to the secondary volume is reset to zero ("0"). In step 909, the control unit writes the data to be transferred to the primary volume.

Figure 10A:
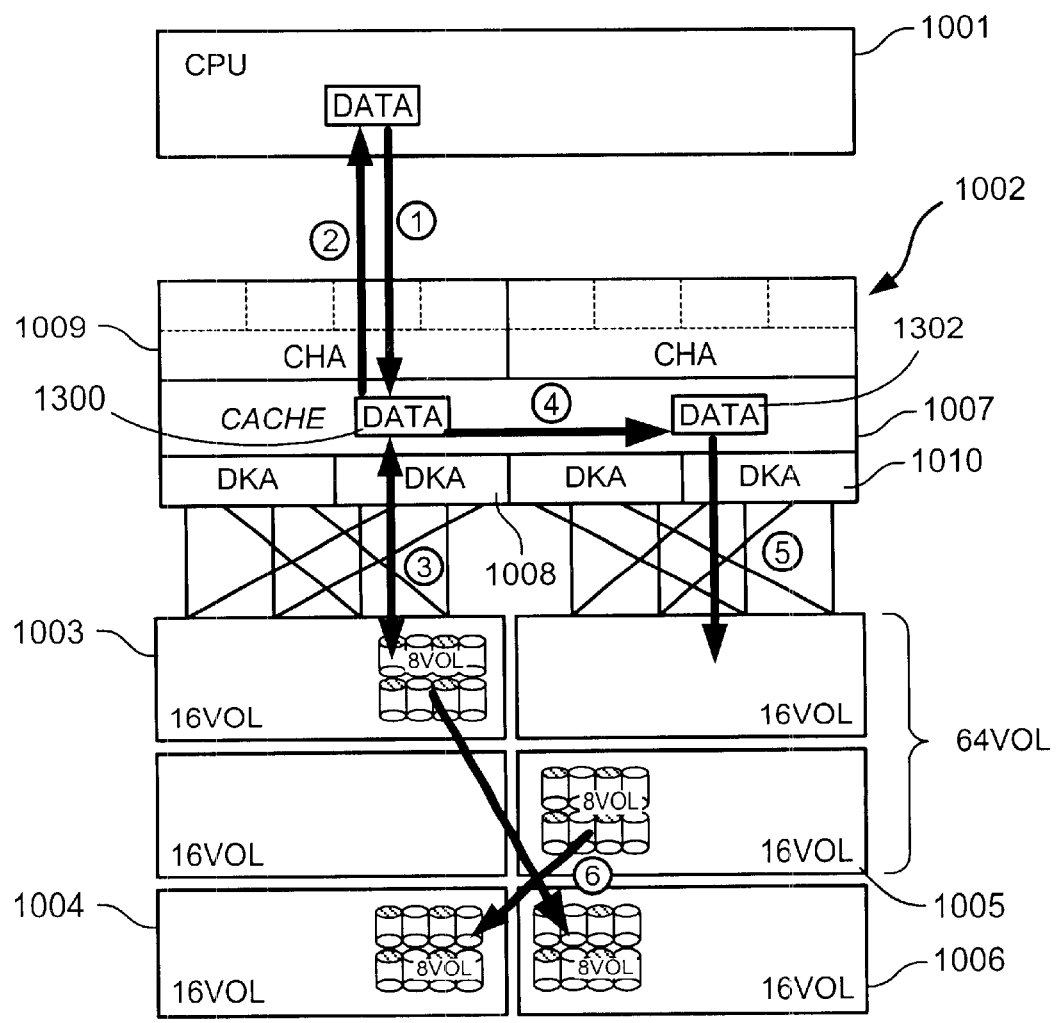
FIGS. 10A–10B illustrate simplified diagrams of example data replications in a representative computing system in a specific embodiment according to the present invention.

FIG. 10A illustrates a simplified block diagram of a representative example of copying data between logical volumes in a specific embodiment according to the present invention. This diagram is merely an illustration and should not limit the scope of the claims herein. One of ordinary skill in the art would recognize other variations, modifications, and alternatives. FIG. 10A illustrates a control unit 1002 comprising a cache memory 1007, a channel adapter ("CHA") 1009, a disk adapter ("DKA") 1008, which are interconnected by a bus (not shown). A plurality of storage devices 1003 and 1004 can be coupled to control unit 1002 via disk adapter 1008, and storage devices 1005 and 1006 can be coupled to control unit 1002 via disk adapter 1010. Further, control unit 1002 can be coupled to, and can execute commands from, a processing unit 1001. Control information can be transferred from a shared memory (not shown) to the channel adapter 1009 or to the disk adapters 1008 and 1010 via the bus.

Arrow number one indicates a host write command sent from the processor 1001 to control unit 1002. Arrow two illustrates a device end that is sent from channel adapter 1009 to processor 1001. Disk adapter 1008 performs a copy of data from primary logical volume 1003 into a first location 1300 in cache memory 1007, as indicated by arrow three. Thereupon, a second copy of the data is made into a second location 1302 in cache memory 1007 and the logical volume number included in the copied data is changed from the primary volume number to the secondary volume number, as indicated by arrow four. As indicated by arrows five and six, the data is copied by disk adapter 1010 into storage device 1006 in order to complete the copy.

Figure 10B:
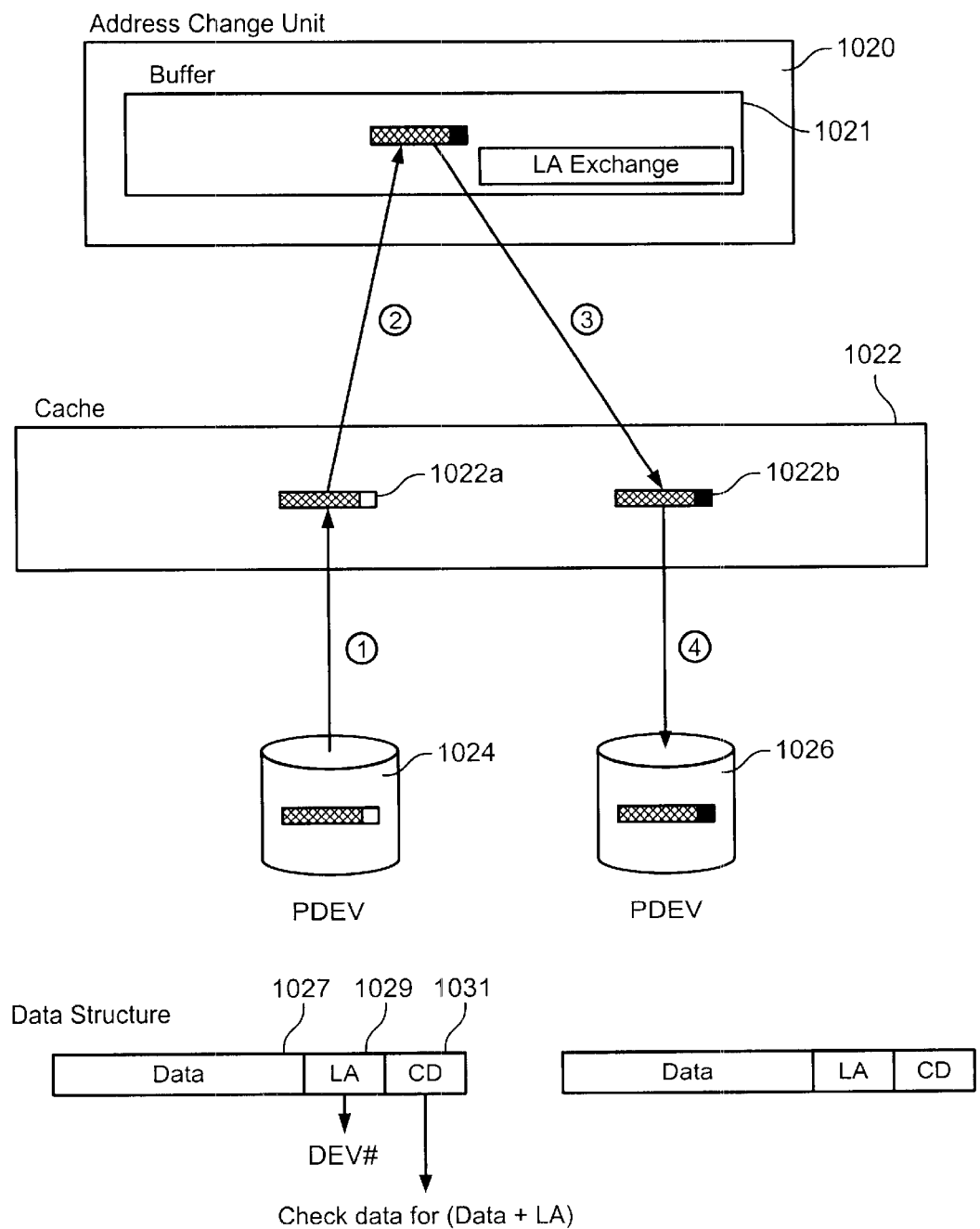

FIG. 10B illustrates a simplified block diagram of a representative example of copying data between locations in a cache memory in a specific embodiment according to the present invention. This diagram is merely an illustration and should not limit the scope of the claims herein. One of ordinary skill in the art would recognize other variations, modifications, and alternatives. FIG. 10B illustrates an address change unit 1020, which in a representative embodiment can be a data recovery and reconstruction (DRR) unit, for example, having a buffer 1021, a cache 1022, a first physical device 1024 and a second physical device 1026. In a particular embodiment, address change unit 1020 can be located within a disk adapter unit, such as disk adapter 108 of FIG. 1, for example. First physical device 1024 and second physical device 1026 can be of many types of storage devices, such as storage devices 103, 104, 105 and 106 of FIG. 1, for example. Cache 1022 can be cache memory 107, for example. Data can be comprise a user data section 1027, a logical address section 1029 and a check code section 1031, for example.

In a specific embodiment according to the present invention, a copy process can execute on DKA processors, for example. A first cache location 1022a and a second cache location 1022b can be secured in cache 1022, for example, to correspond to the first physical device 1024 and second physical device 1026, respectively. A command can be issued to address change unit 1020 to perform a copy of data stored in first physical device to a second physical device. Arrows 1, 2, 3 and 4 illustrate processing of such a command in a representative embodiment. Arrow 1 indicates a copy of the data from the first physical device 1024 into a first cache location 1022a. Then, as indicated by arrow 2, the data is moved from first cache location 1022a into buffer 1021. While data is contained in buffer 1021, a logical address, LA, portion within the data can be changed from indicating a device number (DEV) of first physical device 1024 to a device number of second physical device number 1026. A check code, CD, which can be parity or other type of check data, can be updated to reflect the change in the LA. Arrow 3 illustrates copying of the data from the buffer 1021 into a second location 1022b within cache 1022. Arrow 4 indicates a copy of the information from the second location 1022b in cache 1022 into second physical device 1026.

Figure 11A:
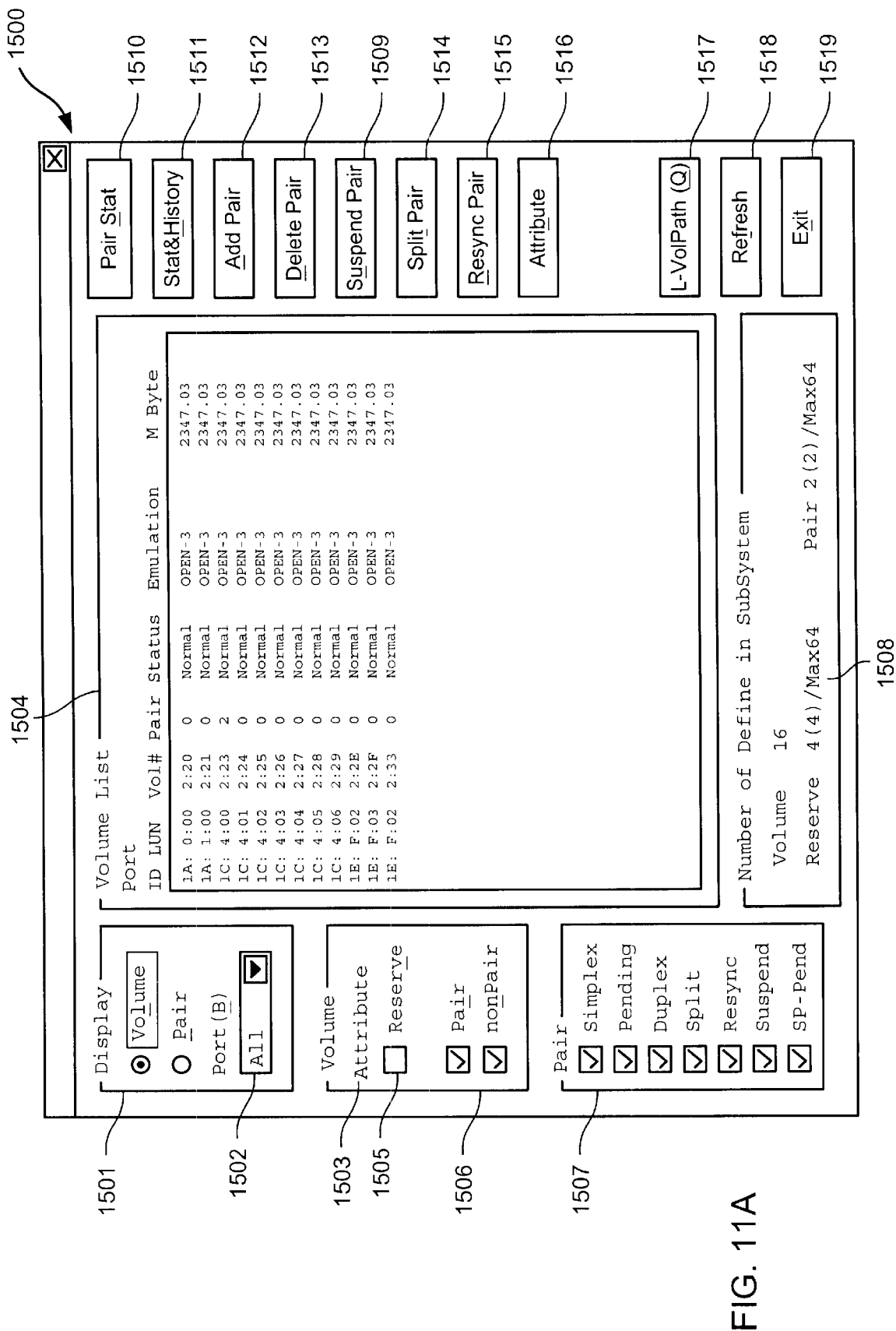

FIGS. 11A–11G illustrate representative display screens in a specific embodiment according to the present invention. FIG. 11A illustrates a representative user interface screen 1500 having a display mode selection area 1501. This diagram is merely an illustration and should not limit the scope of the claims herein. One of ordinary skill in the art would recognize other variations, modifications, and alternatives. Display mode selection area 1501 enables the user to select either a volume display mode, such as illustrated by FIG. 11A, or a pair display mode, such as illustrated by FIG. 11B, using a selection button mechanism. A port selection field 1502 enables the user to specify a desired port, as well as all ports. A volume display control area 1503 becomes active when volume display mode is selected in display mode selection area 1501. Volume display control area 1503 enables the user to "filter" the volumes displayed in a volume list display area 1504. Filtering can be performed by reserve attribute and by pair condition, for example. An attribute reserve box 1505 enables the user to display reserved or unreserved volumes. Furthermore, volume pair/ no pair selection boxes 1506 enable the display of paired and/or non-paired volumes. When volume display mode is selected in display mode selection area 1501, the volume display area 1504 lists installed volumes (LUs) on the selected port and displays information for each volume. Volume display area 1504 provides information about storage. In a present embodiment, such information can include a port identifier, comprising a cluster and channel number, for each volume. A target identifier, including an LU number, for each volume can also be included in display area 1504. Further, display area 1504 can also include a volume number, comprising a control unit and logical device identifier for each volume, a number of pairs formed with the volume. A status of the volume, including normal, blocked, format, correct, copying, or unknown, a d device emulation type (e.g., OPEN-3, OPEN-9), and a storage capacity of the volume can also be displayed.

A pair display control area 1507 enables the user to "filter" the pairs displayed in the volume display area 1504 by pair status. Pair status can include simplex, pending, duplex, split, re-sync, suspend, SP-Pending, for example. A Define status display area 1508 provides a display of DASD usage, including the total number of open system volumes, total and maximum number of reserved volumes and total and maximum number of pairs.

A plurality of buttons along the right side of the screen of FIG. 11A enable the user to perform the following operations. A Pair Status button 1510 displays the pair status for the selected volume(s)/pair(s). A Stat&History button 1511 displays the pair status and history for the selected volume (s)/pair(s). An Add Pair button 1512 enables new pairs to be added. A Delete Pair button 1513 allows pairs to be deleted. Suspend Pair button 1509 enables suspending of a pair. A Split Pair button 1514 allows the user to copy the contents of a source logical volume to a target logical volume in a pair. A Re-sync Pair button 1515 enables the user to re-synchronize pairs. An Attribute button 1516 enables the set/reset of reserve attributes. A T-VOL Path button 1517 displays the secondary logical volume SCSI paths for the selected pair(s). A Refresh button 1518 updates the information displayed. An Exit button 1519 returns to a previous panel.

FIG. 11B illustrates a representative volume list display area in a particular embodiment according to the present invention. This diagram is merely an illustration and should not limit the scope of the claims herein. One of ordinary skill in the art would recognize other variations, modifications, and alternatives. FIG. 11B illustrates volume display area 1504 displaying information about pairs. Information such as port identifiers, logical unit number, control unit numbers and logical device identifiers and volume status can be displayed for both primary and secondary volumes. Additionally, a pair status can be displayed for the volume pair.

Figure 11C:
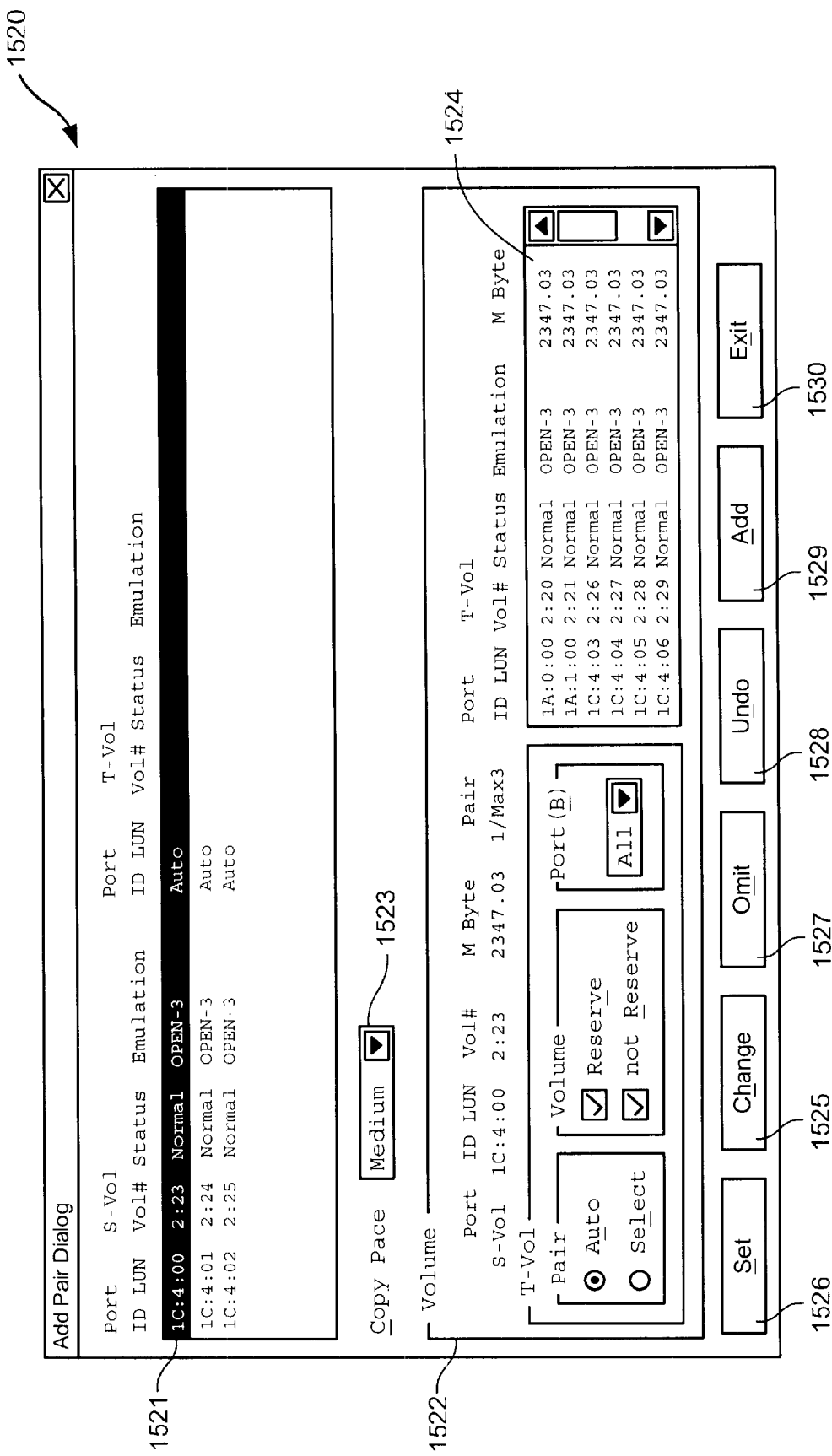

FIG. 11C illustrates a representative panel for adding a pair in a particular embodiment according to the present invention. This diagram is merely an illustration and should not limit the scope of the claims herein. One of ordinary skill in the art would recognize other variations, modifications, and alternatives. FIG. 11C illustrates add pair dialog panel 1520 that can be opened by selecting Add Pair button 1512 on screen 1500 of FIG. 11A. Panel 1520 displays the primary ("S-VOL") and secondary ("T-VOL") information for the pair(s) being added. In a present embodiment, information can include a port, a TID, a LUN, a CU image, an LDEV ID, volume status and emulation type. The secondary volume corresponding to each primary volume can be displayed once the primary volume has been selected. The user can select a secondary volume (i.e., the T-VOL(s)) for each primary volume (i.e., the S-VOL) by highlighting the primary volume in display area 1521, then scrolling through a list of secondary volumes within the volume display area 1522. The user can select a copy pace for adding the pairs using copy pace selection pull down 1523. Copy pace can be slow (one track at a time), medium (three tracks at a time) or fast (fifteen tracks at a time).

Volume display area 1522 displays detailed volume information for a selected pair, including S-VOL ID (port, TID: LUN, CU: LDEV), storage capacity, and number of existing pairs. A T-VOL display area 1524, within volume display area 1522, enables selection of a secondary volume automatically or manually. When Auto is selected, the SVP selects the secondary volume from the set of reserved volumes by LDEV ID (in ascending order, lowest to highest). When Select is selected, the Volume and Port display options can be used to display the available secondary volumes by port and by reserve attribute.

A plurality of buttons includes a Change button 1525, which replaces the secondary volume for the selected primary as specified. A Set button 1526 adds an additional secondary volume to the selected primary volume as specified. An Omit button 1527 deletes the selected primary volume(s)/pair(s) from the list of pairs. An Undo button 1528 undoes the previous Change or Set command. An Add button 1529 adds all pairs in the list. An Exit button 1530 closes dialog panel 1520.

Figure 11D:
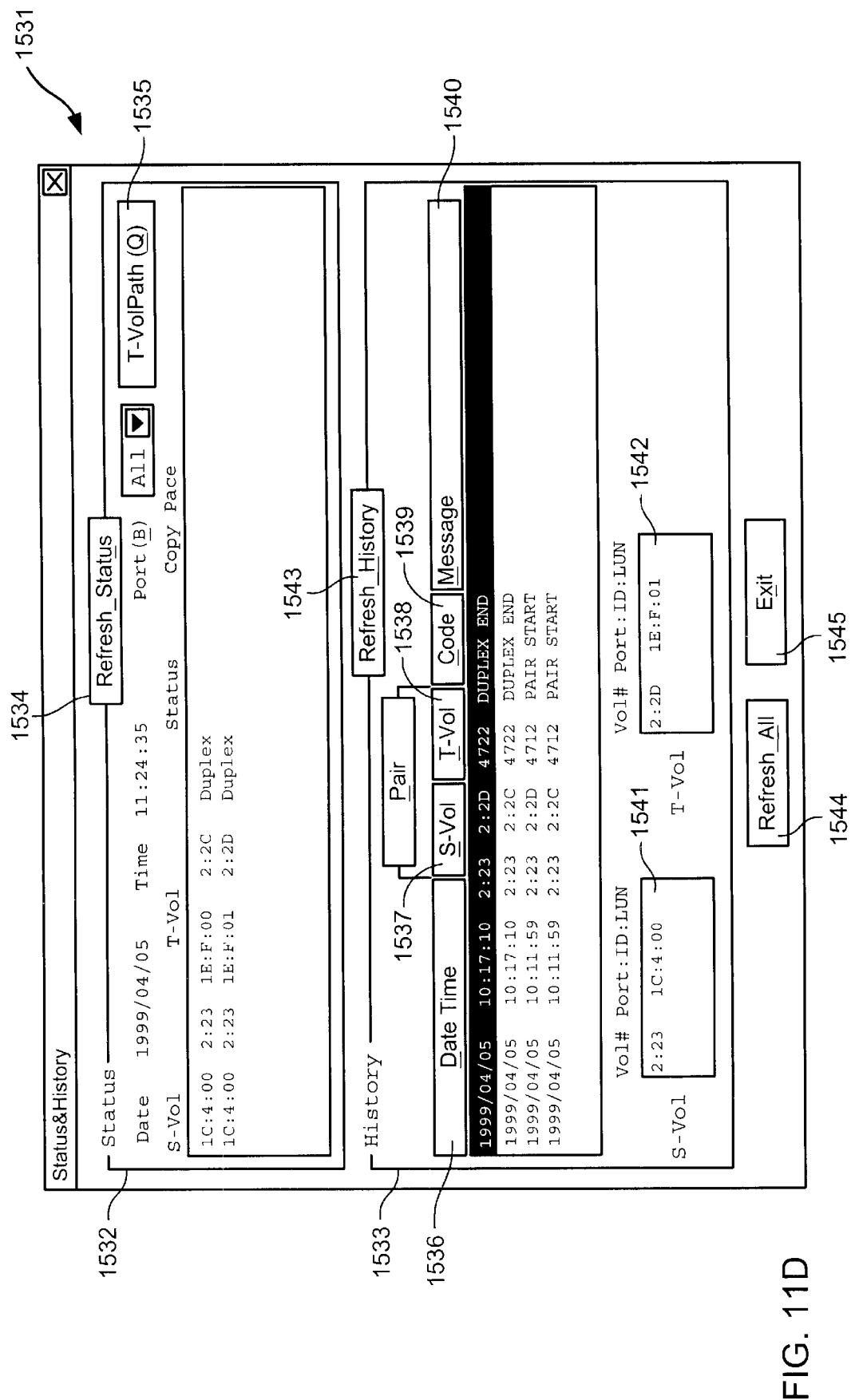

FIG. 11D illustrates a representative panel for displaying pair status and history information in a particular embodiment according to the present invention. This diagram is merely an illustration and should not limit the scope of the claims herein. One of ordinary skill in the art would recognize other variations, modifications, and alternatives. FIG. 11D illustrates status and history panel 1531 that can be opened by selecting Status&History button 1511 on screen 1500 of FIG. 11A. Panel 1531 comprises a status display area 1532 and a history display area 1533. Status display area 1532 can display information for a selected port, for example. Representative pair information for pairs associated with the port can include a primary volume identifier, a secondary volume identifier, a pair status, a copy pace, a date and time that the information was acquired (panel opened/refreshed), and the like. A Refresh Status button 1534 updates the information in status display area 1532. A T-VOL Path button 1535 displays secondary volume SCSI paths for a selected pair or pairs. The History display area 1533 can display history information for a selected port. Displayed pair activity information can be ordered according to date and time, primary volume and secondary volume (CU: LDEV), as well as a volume code and a message type. A Date Time button 1536 sorts the list by date and time. An S-VOL button 1537 and T-VOL button 1538 can cause the list to be sorted by primary volume or secondary volume, respectively. A Code button 1539 can cause the list to be sorted by code number, and a Message button 1540 can cause the list to be sorted according to message type. A current primary volumes display area 1541 and current secondary volumes display area 1542 can display primary and secondary volumes currently used, respectively. A Refresh History button 1543 refreshes the pair history information for the selected port. A Refresh All button 1544 updates all information on the Status & History panel. An Exit button 1545 exits the Status & History panel and returns panel 1500.

Figure 11E:
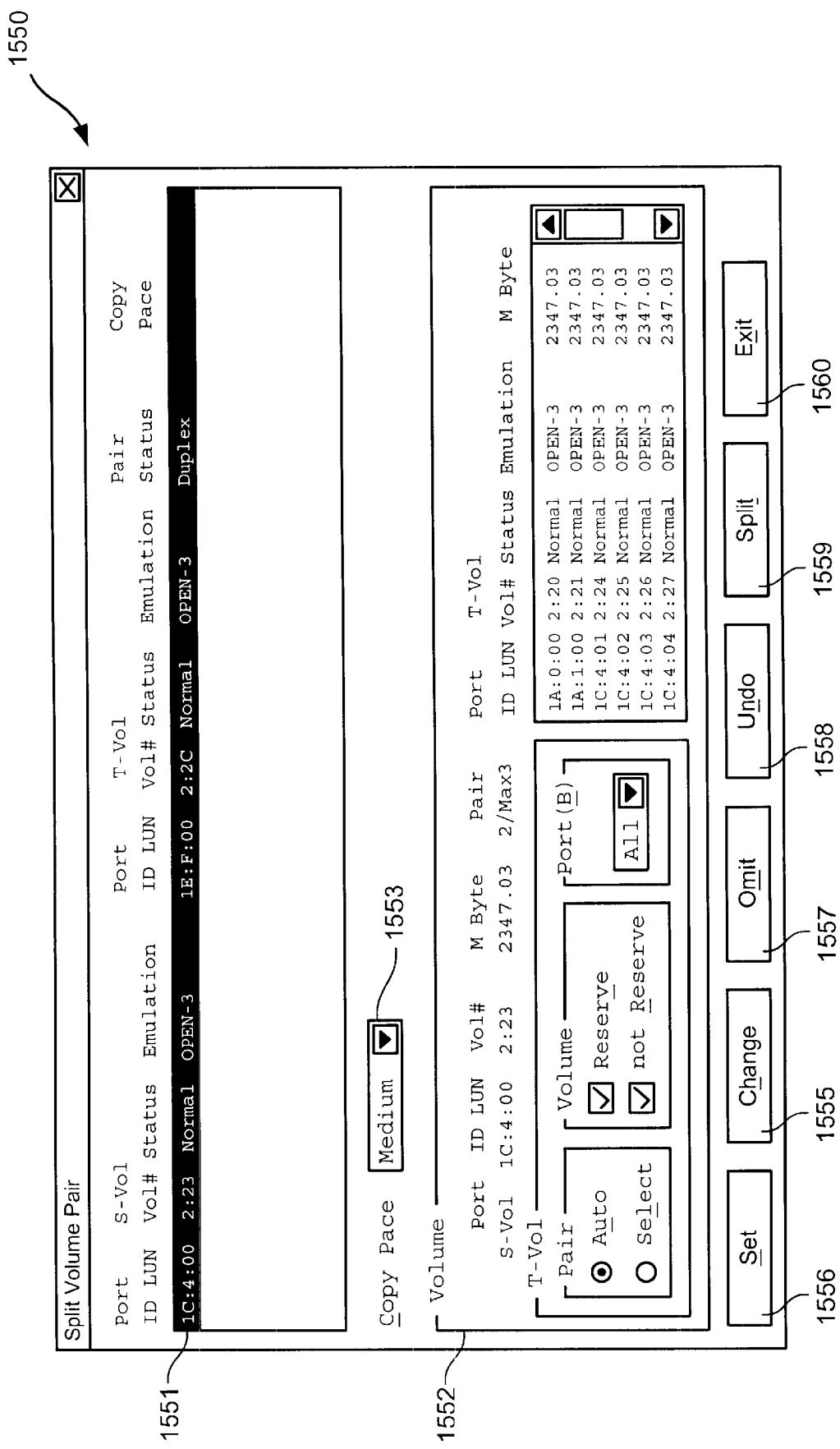

FIG. 11E illustrates a representative panel for creating a copy of a primary volume to a secondary volume in a particular embodiment according to the present invention. This diagram is merely an illustration and should not limit the scope of the claims herein. One of ordinary skill in the art would recognize other variations, modifications, and alternatives. FIG. 11E illustrates split volume panel 1550 that can be opened by selecting Split pair button 1514 on screen 1500 of FIG. 11A. Split volume pair panel 1550 provides the capability to copy data from a primary volume to secondary volumes for pairs in a list of pair(s) selected on panel 1500, showing the pair status and copy pace for each pair. In a present embodiment, information can include a port, a TID, a LUN, a CU image, an LDEV ID, volume status and emulation type. The secondary volume corresponding to each primary volume can be displayed once the primary volume has been selected by highlighting the primary volume in display area 1551. The user can select a copy pace for copying data from the primary to the secondary volume of the pairs using copy pace selection pull down 1553. Copy pace can be slow (one track at a time), medium (three tracks at a time) or fast (fifteen tracks at a time) in a representative embodiment.

Volume display area 1552 displays detailed volume information for a selected pair, including S-VOL ID (port, TID: LUN, CU: LDEV), storage capacity and number of existing pairs. Users can change or add secondary volumes to a primary volume using this panel. A T-VOL display area 1554, within volume display area 1552, enables selection of a secondary volume automatically or manually. When Auto is selected, the SVP selects the secondary by LDEV ID. When Select is selected, the volume and port display options can be used to display the available secondary volumes by port and by reserve attribute.

A plurality of buttons includes a Change button 1555, which replaces the secondary volume for the selected primary as specified. A Set button 1556 adds an additional secondary volume to the selected primary volume as specified. An Omit button 1557 deletes the selected primary volume(s)/pair(s) from the list of pairs. An Undo button 1558 undoes the previous Change or Set command. A split button 1559 splits all pairs in the list. An Exit button 1560 closes dialog panel 1551.

Figure 11F:
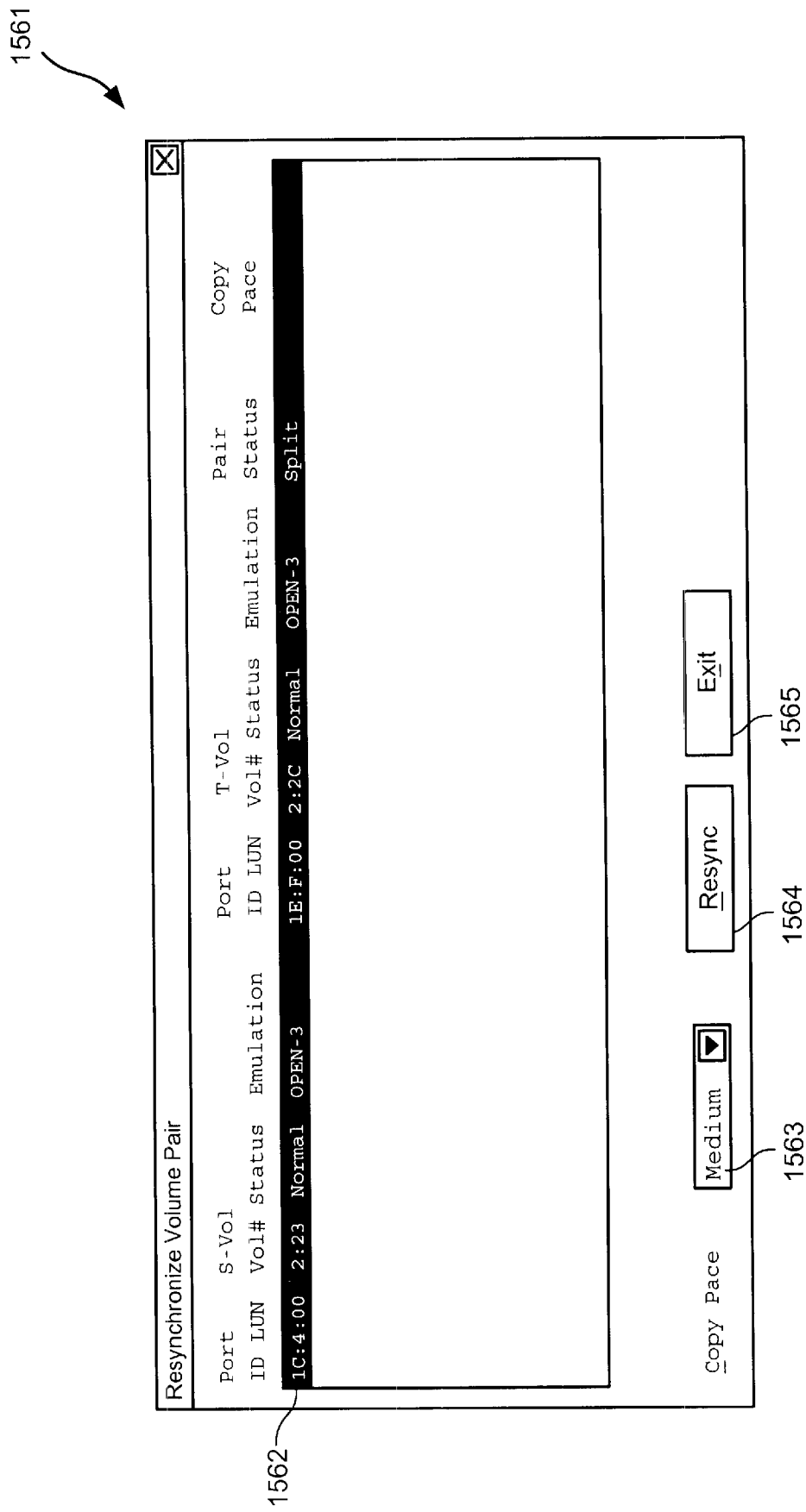

FIG. 11F illustrates a representative panel for providing the capability to re-synchronize data sets in a pair comprising a primary volume and a secondary volume in a particular embodiment according to the present invention. This diagram is merely an illustration and should not limit the scope of the claims herein. One of ordinary skill in the art would recognize other variations, modifications, and alternatives. FIG. 11F illustrates resynchronize volume pair panel 1561. Panel 1561 comprises pair list 1562, listing pair(s) selected from panel 1500 and shows the pair status and copy pace for each pair. The user can select a copy pace for copying data from the primary to the secondary volume of the pairs using copy pace selection pull down 1563. Copy pace can be slow (one track at a time), medium (three tracks at a time) or fast (fifteen tracks at a time) in a representative embodiment. A Re-sync button 1564 starts the re-synchronize operation for the specified pair(s). An Exit button 1565 closes panel 1561.

Figure 11G:
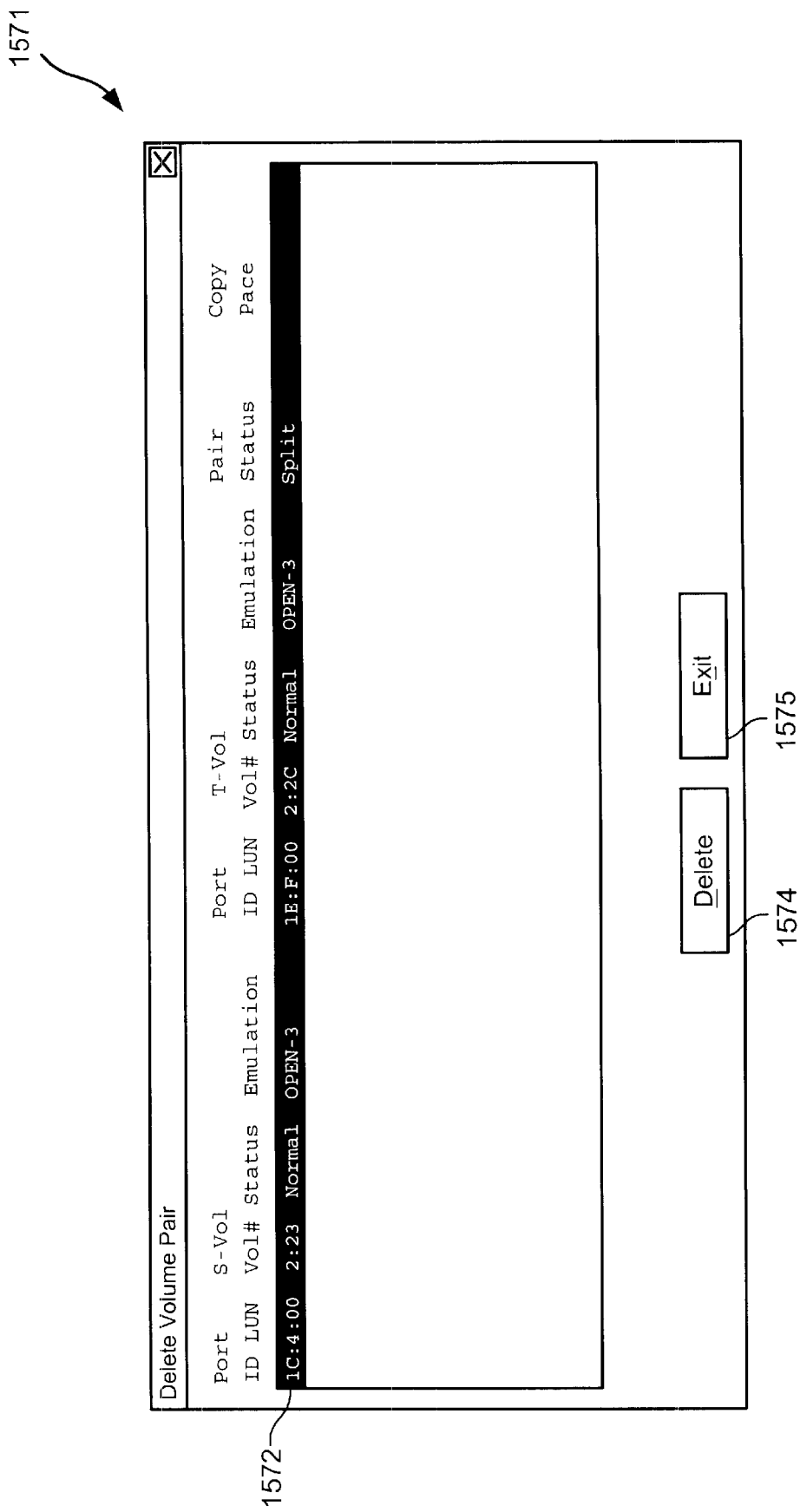

FIG. 11G illustrates a representative panel for providing the capability to delete pairs comprising a primary volume and a secondary volume in a particular embodiment according to the present invention. This diagram is merely an illustration and should not limit the scope of the claims herein. One of ordinary skill in the art would recognize other variations, modifications, and alternatives. FIG. 11G illustrates delete volume pair panel 1571. Panel 1571 comprises pair list 1572, listing pair(s) selected from panel 1500 and shows the pair status for each pair. A delete button 1574 deletes the specified pair(s). An Exit button 1575 closes panel 1571.

CONCLUSION

Although the above has generally described the present invention according to specific systems, the present invention has a much broader range of applicability. In particular, the present invention is not limited to a particular kind of computing system, nor a particular type of storage device.

Thus, in some embodiments, the techniques of the present invention could provide the capability to make copies of data resident on many different types of computer storage systems. The specific embodiments described herein are intended to be merely illustrative and not limiting of the many embodiments, variations, modifications, and alternatives achievable by one of ordinary skill in the art. Thus, it is intended that the foregoing description be given the broadest possible construction and be limited only by the following claims.

The preceding has been a description of the preferred embodiment of the invention. It will be appreciated that deviations and modifications can be made without departing from the scope of the invention, which is defined by the appended claims.

What is claimed is:

1. A method for creating a copy of data in a system comprising a plurality of storage devices, a control unit operable to control said storage devices, and a memory operable to temporarily store data read from said storage devices within said control unit, said storage devices addressable as at least one of a plurality of logical volumes, including a first logical volume and a second logical volume, said method comprising:

specifying a relationship between at least two of said logical volumes, said relationship defined between said first logical volume and said second logical volume;

creating a copy of data in said specified first logical volume into said second logical volume; said creating a copy further comprising:

copying data from said first logical volume to a first location in said memory;

copying said data from said first location in said memory to a second location in said memory;

copying said data from said second location in said memory to said second logical volume;

wherein said copying said data from said first location in said memory to a second location in said memory is performed by said control unit.

2. The method of claim 1, wherein said copying said data from said first location in said memory to a second location in said memory further comprises:

reading data from said first location in said memory into a location within an address change unit;

exchanging a logical address within said data from an address corresponding to said first logical volume to an address corresponding to said second logical volume; and writing said data to said second location in said memory.

3. The method of claim 1 further comprising: if a write request is issued to said first logical volume after creating a copy has commenced, creating a copy of data in said first logical volume to said second logical volume before said data in said first logical volume is modified by said write request.

4. The method of claim 1 wherein said relationship further comprises: a pairing of a primary volume and a secondary volume.

5. The method of claim 1 further comprising: modifying a location identifier defined in each logical volume.

6. The method of claim 1 further comprising: making said second logical volume accessible after said creating a copy of data in said specified first logical volume into said second logical volume.

7. The method of claim 1 further comprising: tracking modified data, if a write request is issued to said first logical volume or said second logical volume after the copy processing is completed, and copying said modified data based upon said tracking, if creating a copy is directed again to the pair in copy completed status.

8. The method of claim 1 further comprising: deleting said relationship.

9. The method of claim 1 wherein said first logical volume is defined as a primary logical volume, said method further comprising:

defining at least one of a plurality of different logical volumes as secondary logical volumes; and defining multiple pairs comprising said primary logical volume and one of said plurality of secondary logical volumes.

10. The method of claim 9 wherein data in said secondary logical volumes comprises a series of historical records of said primary volume, said historical records obtained by switching said secondary logical volumes one after another.

11. The method of claim 1 further comprising: displaying information about said first logical volume and said second logical volume.

12. A method for controlling the copying of information from a first logical volume to a second logical volume in a computer system, said method comprising:

specifying a relationship between said first logical volume and said second logical volume;

creating a copy of data in said first logical volume into said second logical volume; said creating a copy further comprising:

copying data from said first logical volume to a first location into a memory;

copying said data from said first location in said memory to a second location in said memory;

copying said data from said second location in said memory to said second logical volume;

wherein said copying said data from said first location in said memory to a second location in said memory is performed by a control unit substantially independently of a central processing unit.

13. A method for controlling the copying of information from a first logical volume to a second logical volume in a computer system, said method comprising:

specifying a relationship between said first logical volume and said second logical volume;

copying data read from said first logical volume into a memory located within a control unit and thereupon writing said data to said second logical volume; and wherein said copying said data from a first location in said memory to a second location in said memory is performed by a control unit substantially independently of a central processing unit.

14. A computer system comprising a plurality of storage devices, a control unit operable to control said storage devices, and a memory operable to temporarily store data read from said storage devices within said control unit, said storage devices addressable as at least one of a plurality of logical volumes, including a first logical volume and a second logical volume, said control unit operatively disposed to:

establish a relationship between at least two of said logical volumes, said relationship defined between said first logical volume and said second logical volume;

create a copy of data in said specified first logical volume into said second logical volume; said creating a copy further comprising:

copy data from said first logical volume to a first location in said memory;

copy said data from said first location in said memory to a second location in said memory;

copy said data from said second location in said memory to said second logical volume;

wherein said copy said data from said first location in said memory to a second location in said memory is performed by said control unit.

15. The computing system of claim 14 wherein said copy said data from said first location in said memory to a second location in said memory further comprises:

reading data from said first location in said memory into a location within an address change unit;

exchanging a logical address within said data from an address corresponding to said first logical volume to an address corresponding to said second logical volume; and writing said data to said second location in said memory.

16. The computing system of claim 14 wherein said buffer further comprises 10 Gigabytes of storage.

17. The computing system of claim 14 wherein said plurality of storage devices further comprises a RAID.

18. The computing system of claim 14 further comprising a display, said display operable to depict information about said storage devices.

19. The computing system of claim 14, wherein said control unit further comprises a data recovery and reconstruct (DRR), said DRR operative to copy said data from said first location in said memory to a second location in said memory; and thereupon change a volume number associated with said data.

20. A computer program product for controlling the copying of information from a first logical volume to a second logical volume in a computer system, said computer program product comprising:

code for specifying a relationship between said first logical volume and said second logical volume;

code for creating a copy of data in said first logical volume into said second logical volume; said code for creating a copy further comprising:

code for copying data from said first logical volume to a first location into a memory;

code for copying said data from said first location in said memory to a second location in said memory;

code for copying said data from said second location in said memory to said second logical volume;

wherein said copying said data from said first location in said memory to a second location in said memory is performed by a control unit substantially independently of a central processing unit; and a computer readable storage medium for holding the codes.

21. A computer program product for controlling the copying of information from a first logical volume to a second logical volume in a computer system, said computer program product comprising:

code for specifying a relationship between said first logical volume and said second logical volume;

code for copying data read from said first logical volume into a memory located within a control unit and thereupon writing said data to said second logical volume; and wherein said copying said data from said first location in said memory to a second location in said memory is performed by said control unit substantially independently of a central processing unit; and a computer readable storage medium for holding the codes.

22. The computer program product of claim 21 further comprising:

code for displaying information about said first logical volume and said second logical volume.

23. A control unit for controlling the copying of information, said control unit operable in a computing system comprising at least one of a plurality of storage devices, said control unit operable to control said storage devices, at least one of a plurality of processing units operable to access said control unit, said storage devices addressable as at least one of a plurality of logical volumes, including a first logical volume and a second logical volume, said control unit comprising a memory operable to temporarily store data read from said storage devices within said control unit, said control unit operatively disposed to:

copy data read from said first logical volume into said memory located within said control unit;

copy said data from said memory to a different location within said memory, changing a volume identifier associated with said data, and thereupon writing said data to said second logical volume; and wherein said copying said data from a first location in said memory to a second location in said memory is performed by said control unit substantially independently of a central processing unit.

24. A computer system comprising a plurality of storage devices, said storage devices addressable as at least one of a plurality of logical volumes, including a first logical volume and a second logical volume, at least one of a plurality of processing units, a cache memory operable to temporarily store data, and a control unit operable to store and retrieve data from said storage devices on behalf of said processing units;

wherein said control unit is further operable to copy data from a first logical volume to a second logical volume according to a relationship established between said first logical volume and said second logical volume; wherein said control unit copies said data from said first logical volume to a first location in said cache memory; whereupon a data recovery unit within said control unit is operable to create a copy of said data in said first location in said cache memory to a buffer memory within said data recovery unit, and thereupon to copy said data from said buffer memory within said data recovery unit into a second location in said cache memory; and thereupon to copy said data from said second location in said cache memory to said second logical volume;

wherein said data comprises a logical address section, said logical address section having a data content that is changed during said copying between said cache memory and said memory.

25. A computer system comprising:

a first means for storing data;

a second means for storing data;

a cache means for temporarily storing data;

a data recovery and reconstruction means for creating a copy of data from said first means for storing data into said cache means, and thereupon to create a copy of said data in said cache means into said second means for storing data, wherein said data comprises a logical address section, said logical address section having a data content that is changed by said data recovery and reconstruction means from a physical address corresponding to said first means for storing data to a physical address corresponding to said second means for storing data.

26. The method of claim 1, wherein said system comprises at least one of a plurality of processing units operable to access said control unit, and wherein said copying said data from said first location in said memory to a second location in said memory is performed by said control unit substantially independently of said processing units.

27. The method of claim 1, wherein said control unit comprises at least one disk adapter, and wherein said at least one disk adapter performs the step of creating a copy of data in said specified first logical volume into said second logical volume.

28. The method of claim 2, wherein said control unit comprises at least one disk adapter, and wherein said at least one disk adapter comprises said address change unit.

29. The method of claim 14, wherein said system comprises at least one of a plurality of processing units operable to access said control unit, and wherein said copying said data from said first location in said memory to a second location in said memory is performed by said control unit substantially independently of said processing units.

30. The method of claim 14, wherein said control unit comprises at least one disk adapter, and wherein said at least one disk adapter is configured to create said copy of data in said specified first logical volume into said second logical volume.

31. The method of claim 15, wherein said control unit comprises at least one disk adapter, and wherein said at least one disk adapter comprises said address change unit.

32. A method for creating a copy of data in a system comprising a plurality of storage devices, a control unit operable to control said storage devices, said control unit comprising at least one disk adapter and a memory operable to temporarily store data read from said storage devices within said control unit, said storage devices addressable as at least one of a plurality of logical volumes, including a first logical volume and a second logical volume, said method comprising:

specifying a relationship between at least two of said logical volumes, said relationship defined between said first logical volume and said second logical volume;

said at least one disk adapter creating a copy of data in said specified first logical volume into said second logical volume; said creating a copy further comprising:
copying data from said first logical volume to a first location in said memory;
copying said data from said first location in said memory to a second location in said memory;
copying said data from said second location in said memory to said second logical volume.

33. The method of claim 32, wherein said system comprises at least one of a plurality of processing units operable to access said control unit, and wherein said copying said data from said first location in said memory to a second location in said memory is performed by said at least one disk adapter substantially independently of said processing units.

34. The method of claim 32, wherein said disk adapter comprises an address change unit, and wherein said copying said data from said first location in said memory to a second location in said memory further comprises:

reading data from said first location in said memory into a location within said address change unit;

exchanging a logical address within said data from an address corresponding to said first logical volume to an address corresponding to said second logical volume; and writing said data to said second location in said memory.

35. A computer system comprising a plurality of storage devices, a control unit operable to control said storage devices, said control unit comprising at least one disk adapter and a memory operable to temporarily store data read from said storage devices within said control unit, said storage devices addressable as at least one of a plurality of logical volumes, including a first logical volume and a second logical volume, said at least one disk adapter operatively disposed to:

establish a relationship between at least two of said logical volumes, said relationship defined between said first logical volume and said second logical volume;

create a copy of data in said specified first logical volume into said second logical volume; said creating a copy further comprising:
copy data from said first logical volume to a first location in said memory;
copy said data from said first location in said memory to a second location in said memory;
copy said data from said second location in said memory to said second logical volume.

36. The system of claim 35, comprising wherein said system comprises at least one of a plurality of processing units operable to access said control unit, and wherein said copying said data from said first location in said memory to a second location in said memory is performed by said at least one disk adapter substantially independently of said processing units.

37. The method of claim 35, wherein said disk adapter comprises an address change unit, and wherein said copying said data from said first location in said memory to a second location in said memory further comprises:

reading data from said first location in said memory into a buffer location within said address change unit;

exchanging a logical address within said data from an address corresponding to said first logical volume to an address corresponding to said second logical volume; and writing said data to said second location in said memory.

* * * * *